United States Patent
Pullini

(10) Patent No.: US 7,446,525 B2
(45) Date of Patent: Nov. 4, 2008

(54) PRESSURE SENSING DEVICE FOR ROTATABLY MOVING PARTS AND PRESSURE DETECTION METHOD THEREFOR

(75) Inventor: Daniele Pullini, Orbassano (IT)

(73) Assignee: CRF Societa Consortile per Azioni, Torino (IT)

( * ) Notice: Subject to any disclaimer, the term of this patent is extended or adjusted under 35 U.S.C. 154(b) by 245 days.

(21) Appl. No.: 11/049,656

(22) Filed: Feb. 4, 2005

(65) Prior Publication Data

US 2005/0174109 A1    Aug. 11, 2005

(30) Foreign Application Priority Data

Feb. 6, 2004    (EP) .................................. 04425078

(51) Int. Cl.
*G01B 7/14*    (2006.01)
*B60C 23/02*    (2006.01)
(52) U.S. Cl. ............................ 324/207.26; 324/207.21; 340/445; 73/146.2
(58) Field of Classification Search ............ 327/207.23; 73/146.5, 146, 146.2, 146.3, 146.4, 146.8; 324/207.2, 207.21, 207.25, 207.26; 340/445
See application file for complete search history.

(56) References Cited

U.S. PATENT DOCUMENTS

| | | | | |
|---|---|---|---|---|
| 4,570,152 A | * | 2/1986 | Melton et al. ................ | 340/449 |
| 4,600,555 A | * | 7/1986 | Shimizu .......................... | 419/5 |
| 5,542,293 A | * | 8/1996 | Tsuda et al. ................ | 73/146.5 |
| 5,587,698 A | * | 12/1996 | Genna ........................ | 73/146.5 |
| 5,814,725 A | | 9/1998 | Ohshita et al. | |
| 6,854,335 B1 | * | 2/2005 | Burns .......................... | 73/728 |
| 2002/0167309 A1 | * | 11/2002 | Chaparala .............. | 324/207.21 |

FOREIGN PATENT DOCUMENTS

| | | |
|---|---|---|
| DE | 32 42 291 | 5/1984 |
| DE | 44 25 398 | 1/1995 |
| FR | 2 622 289 | 4/1989 |

* cited by examiner

Primary Examiner—Patrick Assouad
Assistant Examiner—David M. Schindler
(74) Attorney, Agent, or Firm—Sughrue Mion, PLLC

(57) ABSTRACT

A magnetic pressure sensing device for rotatably moving parts, of the type including at least one magnetic field source element associated to said rotatably moving part and a magnetic field sensing element associated to a fixed part to measure parameters of a magnetic field determined by said magnetic field source element, said parameters of the magnetic field being a function of the pressure applied to said rotatably moving part. The magnetic field source element includes means for rotating around at least one axis the direction of said magnetic field as a function of the pressure applied to said rotatably moving part.

10 Claims, 4 Drawing Sheets

PRESSURE SENSING DEVICE FOR ROTATABLY MOVING PARTS AND PRESSURE DETECTION METHOD THEREFOR

BACKGROUND OF THE INVENTION

The present invention relates to a magnetic pressure sensing device for rotatably moving parts, of the type comprising at least one electromagnetic field source element associated to said rotatably moving part and a magnetic field sensor element associated to a fixed part to measure parameters of a magnetic field determined by said magnetic field source element, said parameters of the magnetic field being a function of the pressure applied to said rotatably moving part.

Measuring the pressure of rotating parts, such as tyres, has always been difficult, due to the impossibility of wiring a sensor positioned on the moving part.

Of particular interest, for instance, is monitoring the pressure of motor vehicle tyres, even when said motor vehicles are moving, both for general maintenance purposes, and for safety purposes, when the motor vehicle travels at high speed. It is therefore important that the driver be aware at all times of the pressure of the tyres, which may dramatically influence the behavior of the motor vehicle.

Several methods for monitoring tyre pressure and/or temperature are known. Typically, a complex wiring technique is employed, or else transmitters and receivers of electromagnetic waves which require power supplies and antennas.

French Patent no. 2 622 289 discloses a system for measuring pressure in tyres, comprising means which are integral with the rotating part and generate a magnetic field that is variable as a function of the pressure of a compartment of the rotating part. An external magnetic sensor measures the variable magnetic field during the cyclical passage in front of the fixed sensor.

The means that generate a variable magnetic field, operating by means of a linear displacement as a function of the pressure of the magnet associated to the rotating part, which determines a distance variation from the sensor on the fixed part and the consequent variation in the intensity of the measured magnetic field.

Such a system requires a considerable proximity of the sensor element to the tread, to detect magnetic field intensity variations in a precise manner.

SUMMARY OF THE INVENTION

The object of the present invention is to provide a solution capable of fabricating a magnetic pressure sensing device for tyres whose precision is influenced to little or no extent by the precision of the detection of the intensity of the magnetic field.

According to the present invention, said object is achieved thanks to a pressure sensing device, and a corresponding pressure measuring method having the characteristics specifically set out in the claims that follow.

BRIEF DESCRIPTION OF THE DRAWINGS

The invention shall now be described with reference to the accompanying drawings, provided purely by way of non limiting example, in which.

DETAILED DESCRIPTION OF THE INVENTION

The magnetic temperature sensor for rotatably moving parts proposed herein comprises at least one magnetic field source element associated to said rotatably moving part, in a preferred version in an inner part of a tyre such as the inner tube, and a magnetic field sensing element associated to a fixed part, preferably the chassis of a motor vehicle, to measure parameters of the magnetic field of said source elements, said parameters of the magnetic field comprising in particular the direction of said magnetic field, which is made a function of the pressure of said rotatably moving part through the adoption of appropriate means of rotation as a function of pressure.

Figure 1:
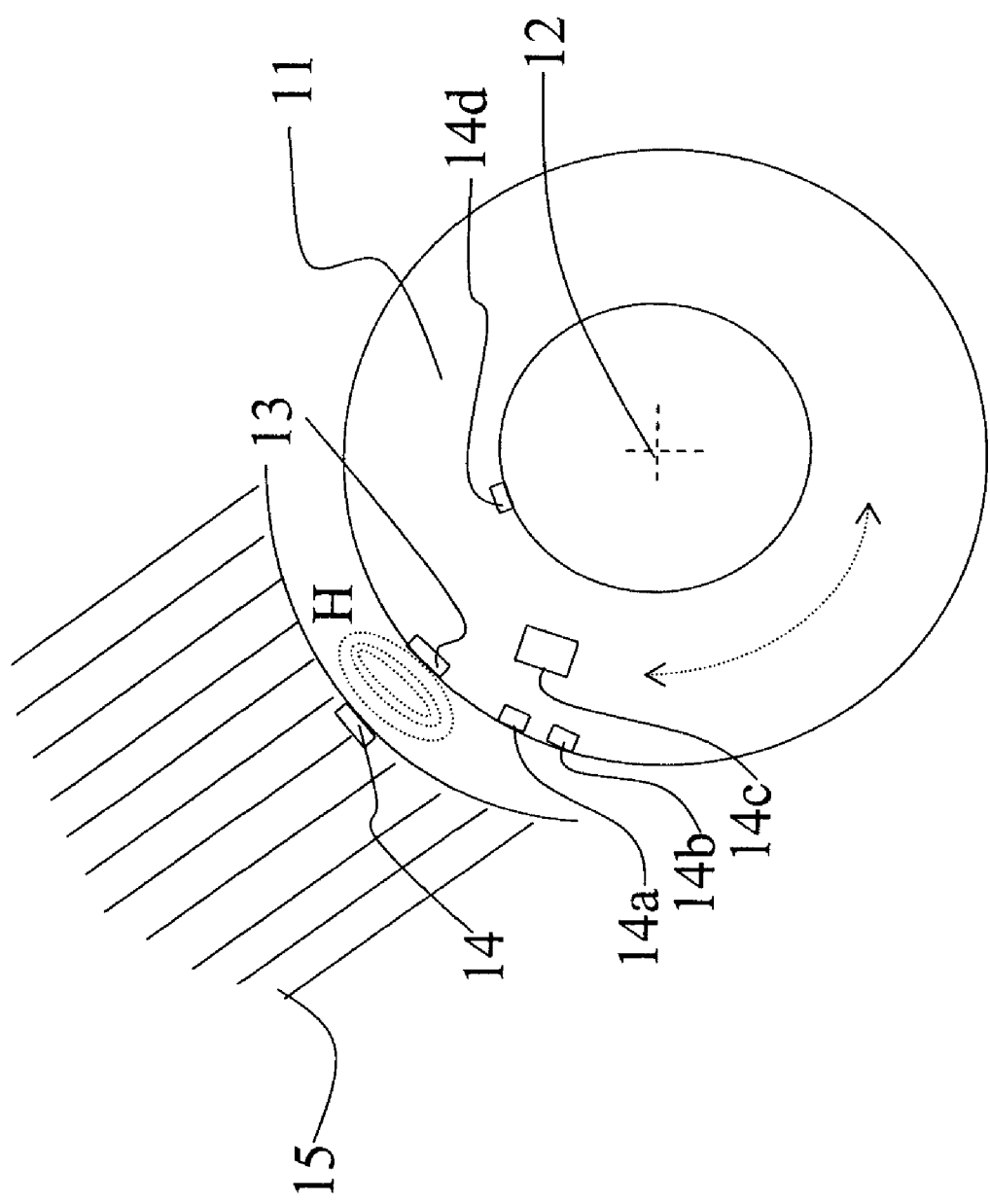
FIG. 1 shows an outline of the principle of operation of a magnetic device according to the invention.

FIG. 1 shows a diagram of the principle of operation of a device according to the invention.

A tyre 11 rotating around an axis of rotation 12 comprises a magnetic field source 13, provided with its own magnetisation and able to determine a magnetic field H.

Said magnetic field source 13 is preferably positioned inside the tyre 11, in the inner tube. On a fixed part, in particular a fender 15 of a motor vehicle, not show in its entirety for the sake of simplicity, is positioned a magnetic field sensor 14.

To the magnetic field H generated by the magnetic field source 13 in the region between the tyre 11 and the fixed part 15 are associated a field intensity and a direction.

According to the invention, the magnetic field H of the magnetic field source 13 can rotate and possibly also change its intensity as a function of the pressure reached by the tyre 11. The magnetic field sensor 14 remotely measures the magnetic field H, thereby indirectly measuring pressure. The signal measured by the magnetic field sensor 14 is then sent to an electronic unit of the motor vehicle, also not shown in FIG. 1, for processing and the generation of signals and alarms.

FIGS. 2A and 2B show in greater detail the magnetic field source 13 associated to the tyre 11.

FIG. 2A shows the magnetic field source 13 in a first operating configuration relating to a value of pressure P equal to P1, whilst FIG. 2B shows the magnetic field source 13 in a second operating configuration relating to a value of pressure P equal to P2, where P2 is greater than P1.

Said magnetic field source 13 according to the invention comprises a permanent magnetic element 21, which generates a magnetic field H with constant modulus and direction. Said permanent magnetic element 21, however, is advantageously associated to a rotating element 22, which rotates according to a revolution motion along an axis 25, radial relative to the circumference defined by the tyre 11.

Figure 2:
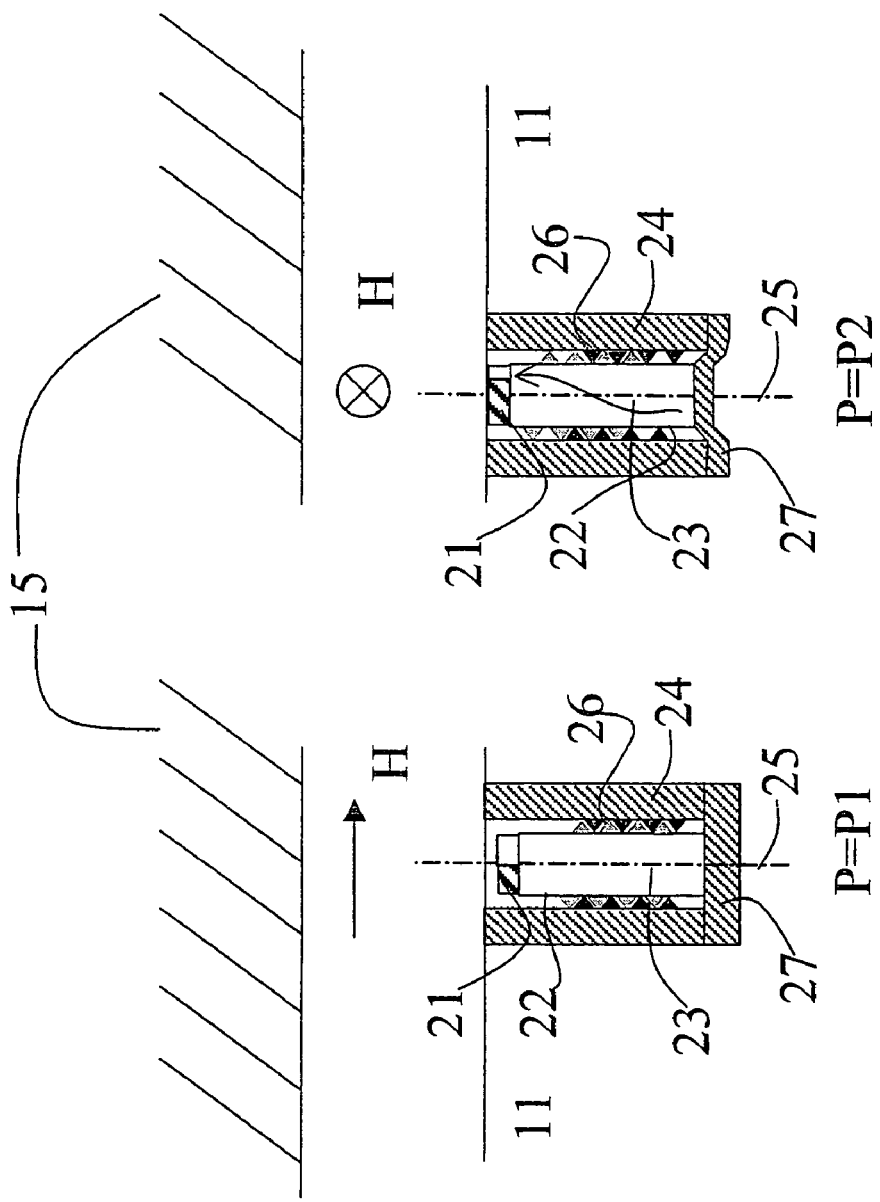
FIGS. 2A and 2B show in detail parts of the device of FIG. 1.

As shown in FIG. 2, the rotating element 22 comprises a threaded bar 23, in practice a screw element, positioned along the axis 25 within a coaxial container cylinder 24, able to limit the vibrations produced by the motion of the tyre 11.

The bar 23 is preferably fastened to a bottom 27 of the cylinder 24 only by means of its own distal end relative to the surface of the tyre 11, in such a way that it follows the axial displacements of said bottom 27, and therefore it is otherwise free to rotate within said cylinder 24 following a thread. On the free end, and thus the proximal one relative to the surface of the tyre 11, of said bar 23 is positioned the permanent magnet 21, which, as shown in FIG. 2A, has its own two poles, and hence the associated magnetic field H, arranged according to a direction that is substantially tangential to the surface of the tyre 11. In FIG. 2A, in particular, the position of the permanent magnet 21 determines a magnetic field H that is tangential and aligned along the direction of rotation of the tyre 11.

In FIG. 2B, as mentioned, the magnetic field source 13 is subjected to a pressure P2 higher than the pressure P1. The bottom 27 of the cylinder 24, which is made of resilient material, by virtue of the pressure rise is deformed, imparting a force along the axis 25 by effect of the thread 26. In FIG. 2B, the permanent magnet 21 is rotated by substantially 90° and determines a magnetisation in substantially perpendicular direction to the direction of rotation of the tyre 11.

Clearly, the bottom 27 could alternatively be formed by means of a piston.

Though not shown in FIG. 2A or 2B, a spring is provided to return the bar 23 to the original resting position when pressure ceases. The pressure measurement, therefore, derives from the resultant of the forces of pressure, elastic decompression of the spring and centrifugal forces of the massive movable parts. Lubricants can be used to minimise friction between threaded bar 23 and thread 26.

The magnetic field sensor 14 indirectly measures the pressure P of the tyre 11, directly measuring the direction of the magnetic field H determined by the magnetisation of the permanent magnet 21 positioned on the rotating element 22.

The magnetic field sensor 14, which can be for instance a spin valve sensor, sensitive to switches in magnetic field direction, is able to perceive the variation in the direction of the magnetic field H, so it can detect the pressure rise. In particular, appropriate circuits and micro-controllers in the electronic unit can be employed to measure the number of rotations of the permanent magnet 21 which take place over time, for instance by means of a simple counter, and hence determine the pressure of the tyre 17.

The permanent magnet 21 can be obtained by means of bulk magnetic materials or hard ferromagnetic thin films plated by the corresponding thin film plating techniques such as sputtering or electroplating. In this case the permanent magnet 21 can comprise a single film or a stack of multiple films, as well as composite materials constituted by ferromagnetic particles, having variable size (from nanometres to millimetres) and shapes, incorporated and magnetised in a polymeric matrix. Particles can be synthesised on site or off-site in the polymer.

Figure 3:
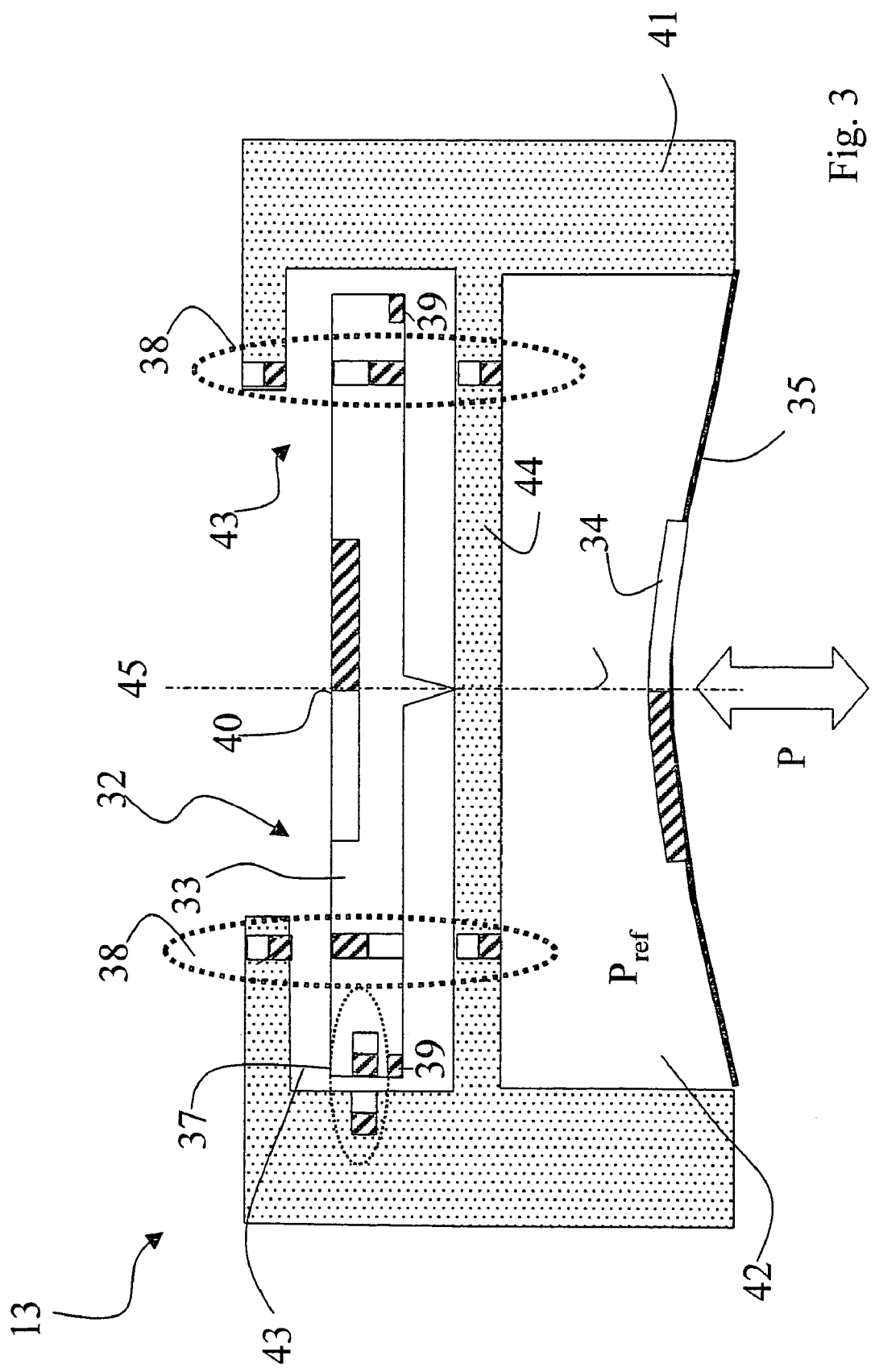
FIG. 3 shows an alternative embodiment of the device of FIG. 1.

FIG. 3 shows an alternative embodiment of the sensor device according to the invention, in which the magnetic field source 13 comprises a rotating element 32 including a rotating disk 33, which is suspended by magnetic levitation in a container 41 made of non-magnetic material, and set in rotation by a permanent magnet 34, which is associated to a deformable elastic membrane 35. In particular, the container 41 superiorly comprises a housing 43 for the disk 33 and inferiorly defines a chamber 42, closed inferiorly by the membrane 35. The chamber 42 and the housing 43 are separated by a wall 44.

The pressure P, external to the chamber 42, acts on the membrane 35, moving in particular, in the direction of an axis 45 perpendicular to the surface of the disk 33, the centre of said membrane 35 whereon is positioned said permanent magnet 34, which comprises sectors with opposite polarity, in such a way as to set in rotation the magnetic disk 33 when it approaches it by effect of the pressure P.

When the pressure P on the membrane 35 decreases, the permanent magnet 34 moves away and the disk 33 can tend to a resting position thanks to appropriate return permanent magnets 37, which substantially operate as magnetic springs.

The rotating disk 33 in turn comprises magnetic sectors 39, positioned on its outermost circumference.

Also provided are magnetic suspensions 38, formed by means of appropriate magnets with opposite polarity, which therefore repel each other, positioned in pairs on the disk 33 and on the container 41, to allow the disk 33 to levitate and rotate in the absence of friction.

The central area of the disk 33 bears a permanently magnetised area 40, which generates the magnetic field H that is measured by the magnetic field sensor 14. The magnetic field sensor 14 in this case needs to be sensitive only to variations in the direction of the magnetisation of said permanently magnetised area 40.

The interior of the chamber 42 may be pressurised to a reference pressure $P_{ref}$, in such a way that the membrane 35 is deflected only after the pressure P is greater than said reference pressure $P_{ref}$.

It should be noted that, in the sensor device of FIG. 3, the centrifugal force on the tyre 11 acts in the same direction as the pressure P. Said centrifugal force can therefore manifest itself as an error in the pressure reading and thus needs compensation.

The effect of centrifugal force can be minimised by providing movable parts with defined ratios between mass and dimensions, in particular the membrane 35 and the magnetic disk 33 for this purpose must have a reduced and a large surface. In fact, the pressure P determines a force which is proportional to the surface, whilst centrifugal force is a function of mass.

Additionally, in the case of a tyre 11 of a motor vehicle, one can exploit, when present, the ABS braking control system, which for its operation measures the velocity of rotation of the wheel. From said measurement of the velocity of the wheel, therefore, it is possible to calculate centrifugal force and correct, for instance in the electronic unit of the motor vehicle, for each velocity of rotation the pressure measurement obtained.

Figure 4:
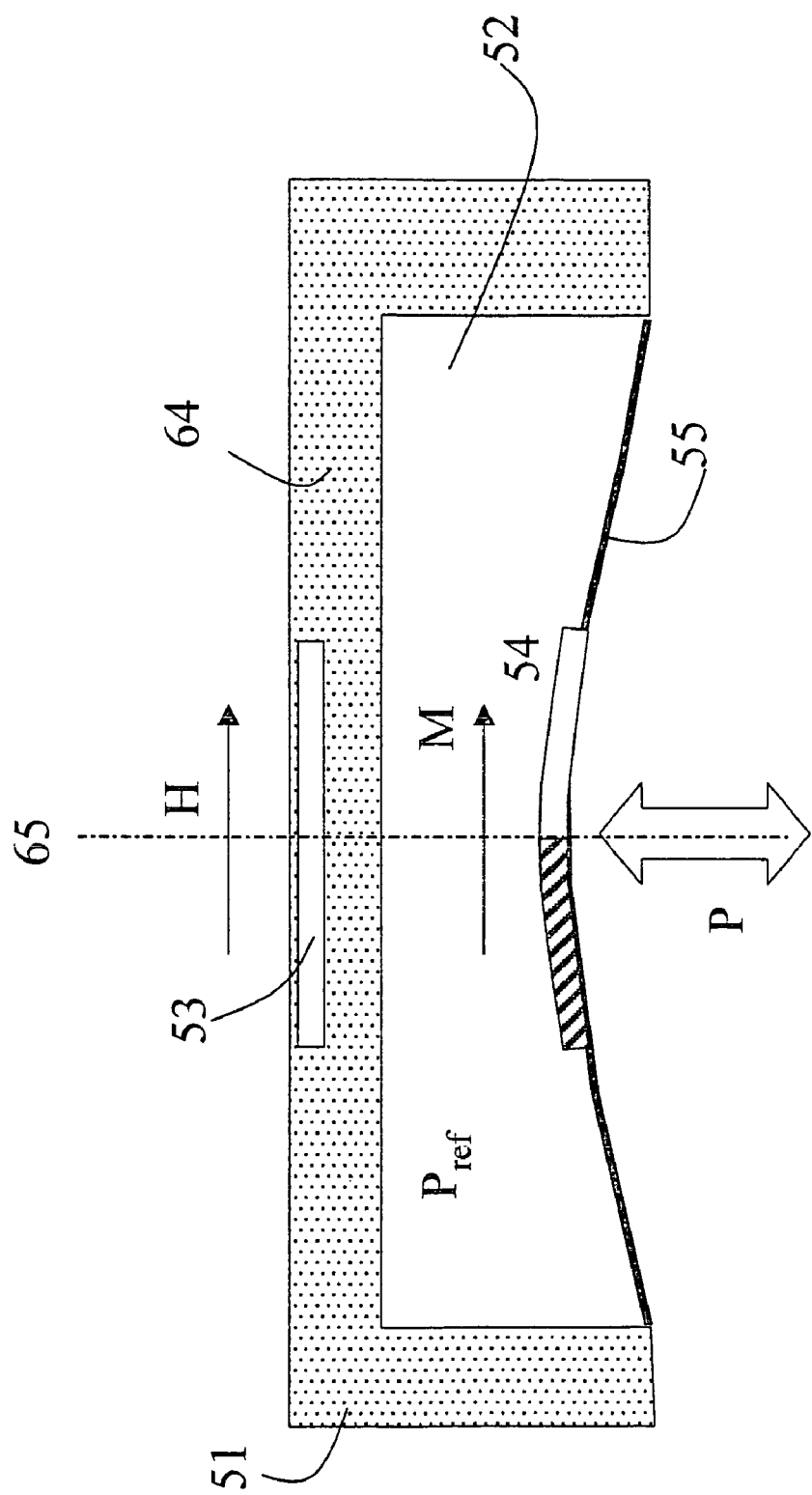
FIG. 4 shows a second alternative embodiment of the device of FIG. 1.

FIG. 4 shows a schematic view of an additional embodiment, in which the magnetic field sensor 14 positioned on the fixed part 15 is sensitive solely to the direction of the magnetic field H. The magnetic field source 13 in this case comprises a container 51 made of non-magnetic material which defines a single chamber 52 under reference pressure $P_{ref}$, delimited inferiorly by a resilient membrane 55 and superiorly by a wall 64. Said membrane 55 bears a permanent magnet 54 having a direction of magnetisation M that is substantially parallel to the surface of the membrane. Similarly to the device of FIG. 3, the pressure P is exerted on the outer surface of said membrane 55, along an axis 65. The container 51 in the wall 64 positioned superiorly to the chamber 52 has an anisotropic ferromagnetic layer 53, whose magnetisation, at rest and in the absence of applied pressure is oriented along the axis orthogonal to the direction of magnetisation M of the permanent magnet 54 lying on the membrane 55.

When, by effect of the pressure P, the membrane 55 with its permanent magnet approaches the anisotropic ferromagnetic layer 53, the permanent magnet 54 on the membrane 55 tends to influence, and then rotate the direction of magnetisation of the anisotropic ferromagnetic layer 53, and hence the direction of the magnetic field H, making it parallel to its own magnetisation. FIG. 4 shows said operating configuration, in which the field H produced by the anisotropic ferromagnetic layer 53 is parallel to the direction of magnetisation M of the permanent magnet 54, since said permanent magnet 54 has moved closer under the effect of the pressure P.

Thus, a displacement of the permanent magnet 54 along the axis 65 by effect of the pressure P exerted on the membrane 55 determines a rotation of the magnetic field H originated by the anisotropic ferromagnetic layer 53, which can be measured by the magnetic field sensor 14.

Said rotation of the magnetic field H of the anisotropic ferromagnetic layer 53 is generally not a sudden transition with respect to the change in the distance from the permanent 54; rather, it is usually a continuous function of distance, since the magnetic domains of the anisotropic ferromagnetic layer 53 do not all switch together. It is therefore possible, by measuring the angle of the direction of the magnetic field H, to have a continuous measurement of the distance of the permanent magnet 54 relative to the anisotropic ferromagnetic layer 53, and hence a continuous measurement of the exerted pressure P.

The anisotropic ferromagnetic layer 53 can be obtained by means of a composite structure of magnetic particles incorporated in a matrix.

The membrane 55 can be constituted by a composite elastomeric material, in which the oriented magnetic particles incorporated in an elastomer provide the membrane with magnetic properties whilst altering its elastic properties only to a minimal extent. The magnetic particles can be created on-site during the formation of the polymer, or incorporated subsequently. The elastomer is made reticular in a magnetic field. The magnetic membrane therefore behaves like an elastic permanent magnet.

The solution described above allows to achieve considerable advantages over prior art solutions.

The pressure sensing device according to the invention advantageously allows to correlate the pressure with rotations in the direction of the magnetic field, so that the correct determination of the intensity of said magnetic field to the sensor has less influence, because the transitions determined by the rotating element can be measured.

Naturally, without altering the principle of the invention, the construction details and the embodiments may vary widely relative to what is described and illustrated purely by way of example herein, without thereby departing from the scope of the present invention.

It is possible to insert a permanent magnet whose magnetisation modulus varies even considerably with pressure.

It must also be kept in mind that there may be combinations of the different embodiments described above for the magnetic field source element and, in particular, there may be multiple elements, of the same type or of different types, located on the rotatably moving part. The signals measured by one or more sensors on the fixed part, which represent a composite information about pressure, can then be conveniently analysed and processed.

The magnetic field sensor can be obtained with any digital or analogue magnetic field sensor, such as a simple solenoid, or an AMR (Anisotropic Magnetic Resistance), Hall, GMR (Giant Magnetic Resistance), TMR (Tunnel junction Magneto Resistance) sensor.

A pressure sensor device of the type described above can be used in a variety of applications requiring the measuring of a pressure.

In relation to measuring pressure in a tyre, the pressure sensor may be a part of an appropriate measuring unit 14c, further comprising tyre wear sensors and/or temperature sensors 14b and, possibly, actuators 14d and 14a or valves to re-establish tyre pressure, said unit being located directly on the tyre and powered independently through the conversion of vibration energy deriving from the motion of the tyre.

In particular, it is possible to exploit the sensor positioned on the fixed part to detect magnetic field variations in intensity and/or direction of other magnetic field sources under the control of other quantities, such as temperature.

However, it is clear that the proposed device can be applied in all pressure measurements compatible with a magnetic pressure sensing device like the one described herein, which includes at least one magnetic field source element associated to a rotatably moving part and a magnetic field sensing element associated to a fixed part to measure parameters of a magnetic field determined by said magnetic field source element, said parameters of the magnetic field being a function of the pressure of said rotatably moving part, where the magnetic field source element comprises means for rotating the direction of the emitted magnetic field along at least one axis.

The invention claimed is:

1. A magnetic pressure sensing device for a rotatably moving part comprising:
    a magnetic field source element associated to said rotatably moving part, said magnetic field source element comprises a first permanent magnet for generating a magnetic field; and
    a magnetic field sensing element associated with a fixed part to measure parameters of the magnetic field generated by the first permanent magnet, said parameters of the magnetic field (H) being a function of pressure applied to said rotatably moving part,
    wherein said magnetic field source element comprises rotating means for rotating a direction of said magnetic field about at least one axis as a function of the pressure applied to said rotatably moving part,
    wherein said rotating means comprise converting means for converting a force determined by said pressure applied along said axis into a rotation of the direction of said magnetic field,
    wherein said converting means comprise means for converting said force into a displacement along said axis,
    wherein said means for converting said force into a displacement along said axis comprise a resilient membrane,
    wherein said resilient membrane is associated with a second permanent magnet and
    wherein said first permanent magnet is associated with a levitating disk able to be set in rotating motion by said second permanent magnet.

2. A device as claimed in claim 1, wherein the direction of the magnetic field of said first permanent magnet is aligned with a direction of a magnetization of the second permanent magnet as a function of the distance between said first and second permanent magnets.

3. A device as claimed in claim 1, wherein said parameters of the magnetic field measured by the magnetic field sensing element comprise the direction and/or the intensity of the magnetic field.

4. A device as claimed in claim 1, wherein said magnetic field sensing element is able to measure the magnetic field parameters of additional sources of magnetic field, variable according to a physical quantity and associated to said rotatably moving part.

5. A device as claimed in claim 1, wherein said moving part is a tire for motor vehicle.

6. A device as claimed in claim 1, wherein said first permanent magnet and/or second permanent magnet are formed with magnetic materials or hard ferromagnetic thin films or composite materials constituted by ferromagnetic particles incorporated and magnetised in a polymeric matrix.

7. A device as claimed in claim 1, wherein said magnetic field sensing element is a spin valve device.

8. A method for measuring the pressure of rotatably moving parts using the device as claimed in claim 1, wherein the method associates variations in pressure to variations in the direction of the magnetic field generated by the magnetic field source element and measured by the magnetic field sensing element.

9. A method as claimed in claim 8, wherein the method further associates variations in pressure to variations in the intensity of the magnetic field generated by the magnetic field source element and measured by the magnetic field sensing element.

10. A magnetic pressure sensing device for rotatably moving parts, comprising:
- a magnetic field source element associated to said rotatably moving part (11); and
- a magnetic field sensing element (14) associated to a fixed part (15) to measure parameters of a magnetic field (H) determined by said magnetic field source element (13), said parameters of the magnetic field (H) being a function of pressure (P) applied to said rotatably moving part (11), wherein:
- said magnetic field source element (13) comprises rotating means (22) for rotating around at least one axis (25) the direction of said magnetic field (H) as a function of the pressure (P) applied to said rotatably moving part (11),
- said magnetic field source element (13) comprises at least a first permanent magnet (21; 40; 53) for generating the magnetic field (H),
- said rotating means (22) include converting means (26, 27; 35; 55) for converting a force determined by said pressure (P) applied along said axis (25; 45; 65) into a rotation of the direction of said magnetic field (H), and a second permanent magnet (34; 54) associated with said converting means,
- said first permanent magnet (21; 40; 53) is associated at a fixed position along said axis (45; 65) to a wall portion (44; 64) of a chamber (42; 52) defined in said converting means (35; 55), said wall portion (44; 64) superiorly closing said chamber (42; 52), and said converting means for converting said force into a displacement along said axis (45; 65) comprise a resilient membrane (35; 55) defining a inferior closing portion of said chamber (42; 52), wherein said first permanent magnet (40") is associated to a levitating disk (33) able to be set in rotating motion by said second permanent magnet (34).

* * * * *